UNITED STATES PATENT OFFICE 2,654,753

2-SULFANILAMIDO-5-AMINOPYRIMIDINE AND SALTS THEREOF

William T. Caldwell, Moorestown, N. J., assignor to Eli Lilly and Company, Indianapolis, Ind., a corporation of Indiana No Drawing. Application February 12, 1951, Serial No. 210,634

5 Claims. (Cl. 260—239.75)

This invention relates to new sulfonamide compounds and more particularly to 2-sulfanilamido-5-aminopyrimidine and cationic salts thereof.

2-sulfanilamido-5-aminopyrimidine is represented by the following formula

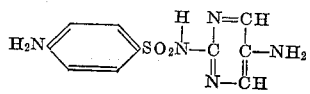

The formulas of cationic salts of the above compound cannot be represented accurately but such salts are generally represented by showing the hydrogen atom of the sulfonamide grouping to be replaced by one equivalent of a cation. Suitable cationic salts include the alkali metal salts, e. g. the sodium and potassium salts, the alkaline earth salts, e. g. the calcium and magnesium salts, and the ammonium and substituted ammonium salts.

2 - sulfanilamido - 5 - aminopyrimidine is prepared by reacting 2-acetylsulfanilyl chloride with 2-amino-5-benzoylaminopyrimidine, to produce 2 - acetylsulfanilamido-5-benzoylaminopyrimidine. The acetyl and benzoyl groups, which serve as protective groups during the above condensation are then removed by alkaline hydrolysis to yield 2-sulfanilamido-5-aminopyrimidine in the form of a cationic salt, the cation being that ion present in the alkali employed for hydrolysis. Neutralization of the aqueous alkaline reaction mixture yields a precipitate of 2-sulfanilamido-5-aminopyrimidine in its free or acid form.

The compounds of this invention and their preparation are further illustrated by the following specific examples.

Example 1

56 g. of 2-amino-5-nitropyrimidine prepared according to the method of Roblin, Winneck and English are mixed with 125 ml. of acetic anhydride and 1 g. of anhydrous sodium acetate, and the mixture is heated in an oil bath to about 150° C. for about 4 hours, and is then heated on a steam bath for about 10 hours. The mixture is cooled in ice, whereupon crystals of 2-acetamino-5-nitropyrimidine separate. The crystals are filtered off, and 31 g. of the dried crystals are suspended in 150 ml. of ethanol, and 0.3 g. of Adams platinum oxide catalyst are added. The mixture is hydrogenated under 40 pounds pressure until the theoretical amount of hydrogen is taken up. The hydrogenated mixture containing 2-acetamino-5-aminopyrimidine is filtered to remove the catalyst, and the ethanol is evaporated in vacuo. During the filtration and evaporation, care is taken to prevent undue exposure to air. The solid residue of 2-acetamino-5-aminopyrimidine left upon evaporation is treated with 30 ml. of benzoyl chloride and 310 ml. of 1.1 N potassium hydroxide solution. The mixture is kept cold and shaken occasionally over a period of about 10 hours during which time a precipitate of 2-acetamino-5-benzoylaminopyrimidine separates. The precipitate is filtered off and washed well with cold water. The 2-acetamino-5-benzoylaminopyrimidine melts at about 281–284° C. A sample obtained in accordance with the above procedure upon analysis showed the presence of 21.31 percent nitrogen as compared with the calculated value of 21.85 percent nitrogen.

39 g. of 2-acetamino-5-benzoylaminopyrimidine are refluxed for one half hour with 170 ml. of 1.1 N aqueous potassium hydroxide solution. The mixture is cooled and filtered, leaving as a residue upon the filter, 22 g. of 2-amino-5-benzoylaminopyrimidine. The residue is recrystallized from 900 ml. of boiling water, yielding purified 2-amino-5-benzoylaminopyrimidine which melts at about 214–217° C. Analysis of a sample obtained in accordance with the above procedure showed the presence of 26.13 percent of nitrogen as compared with the calculated value of 26.12 percent nitrogen.

14.4 g. of 2-amino-5-benzoylaminopyrimidine are dissolved in about 50 ml. of dry pyrimidine and to the solution is added a solution of 17 g. of acetylsulfanilyl chloride in 35 ml. of dry pyrimidine, the addition being carried out slowly with stirring and cooling in an ice bath. The mixture is heated on a steam bath for about one hour and is poured into 1500 ml. of cold water. The precipitate of 2-acetylsulfanilamido-5-benzoylaminopyrimidine which separates is filtered off, washed with water and dried. The yield is about 18.6 g. The precipitate melts at about 283–288° C. Analysis of 2-acetylsulfanilamido-5-benzoylaminopyrimidine prepared as above showed the presence of 16.85 percent nitrogen as compared with the calculated value of 17.01 percent nitrogen.

To 38.9 g. of 2-acetylsulfanilamido-5-benzoylaminopyrimidine are added 300 ml. of a 2 N solution of potassium hydroxide in 50 percent aqueous methanol, and the mixture is refluxed on a steam bath for about 12 hours. The reaction mixture is cooled, and neutralized with acetic acid whereupon a precipitate of 2-sulfanilamido-5-aminopyrimidine separates. The precipitate is purified by recrystallization from water yielding 19 g. of 2-sulfanilamido-5-aminopyrimidine in the form of white needles which melt with decomposition at about 256–259° C.

Analysis of 2-sulfanilamido-5-aminopyrimidine prepared as above showed the presence of 45.19 percent carbon, 4.05 percent hydrogen, and 26.58 percent nitrogen as compared with the calculated values of 45.28 percent carbon, 4.18 percent hydrogen and 26.40 percent nitrogen.

*Example 2*

5 g. of 2-sulfanilamido-5-aminopyrimidine are suspended in 50 ml. of water and a molecular equivalent of potassium hydroxide solution is added. 2-sulfanilamido-5-aminopyrimidine dissolves readily with the formation of its potassium salt. Evaporation of the solution to dryness yields the potassium salt of 2-sulfanilamido-5-aminopyrimidine.

In the same manner there are prepared the lithium, sodium, magnesium, calcium and ammonium salts of 2-sulfanilamido-5-aminopyrimidine.

The compounds of this invention have a surprisingly high antibacterial action against coliform organisms. They cause no gastric distress upon ingestion. Moreover, they are only very poorly absorbed from the mammalian intestinal tract, so that large doses of the compounds can be administered without causing an appreciable blood concentration of 2-sulfanilamido-5-aminopyrimidine. Accordingly the compounds are well adapted for oral use as intestinal antiseptics. For such use the compounds can be provided in any of the usual medication forms, including tablets, solutions, suspensions, and the like. 2-sulfanilamido-5-aminopyrimidine in both its acid and salt forms can be used in providing oral dosage forms, the choice as to acid or salt form being a matter of selection for the particular dosage forms to be employed.

I claim:

1. A member of the group consisting of 2-sulfanilamido-5-aminopyrimidine and its alkali metal, alkaline earth metal and ammonium salts.
2. 2-sulfanilamido-5-aminopyrimidine.
3. Alkali metal salts of 2-sulfanilamido-5-aminopyrimidine.
4. Alkaline earth metal salts of 2-sulfanilamido-5-aminopyrimidine.
5. Sodium 2-sulfanilamido-5-aminopyrimidine.

WILLIAM T. CALDWELL.

References Cited in the file of this patent

UNITED STATES PATENTS

| Number | Name | Date |
|---|---|---|
| 2,403,713 | English | July 9, 1946 |
| 2,430,439 | Winnek et al. | Nov. 4, 1947 |